(12) United States Patent
Niimi

(10) Patent No.: US 9,108,634 B2
(45) Date of Patent: Aug. 18, 2015

(54) VEHICLE DRIVE CONTROL APPARATUS

(75) Inventor: Kuniaki Niimi, Toyota (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/232,029

(22) PCT Filed: Jul. 11, 2011

(86) PCT No.: PCT/JP2011/065826
§ 371 (c)(1),
(2), (4) Date: Jan. 10, 2014

(87) PCT Pub. No.: WO2013/008306
PCT Pub. Date: Jan. 17, 2013

(65) Prior Publication Data
US 2014/0163799 A1  Jun. 12, 2014

(51) Int. Cl.
| | |
|---|---|
| B60W 20/00 | (2006.01) |
| B60K 6/445 | (2007.10) |
| B60W 10/06 | (2006.01) |
| B60W 10/08 | (2006.01) |
| F02N 11/08 | (2006.01) |
| F02D 29/02 | (2006.01) |
| B60K 6/365 | (2007.10) |
| B60W 30/18 | (2012.01) |

(52) U.S. Cl.
CPC ............. *B60W 20/108* (2013.01); *B60K 6/365* (2013.01); *B60K 6/445* (2013.01); *B60W 10/06* (2013.01); *B60W 10/08* (2013.01); *B60W 20/00* (2013.01); *F02D 29/02* (2013.01); *F02N 11/0837* (2013.01); *B60W 20/40* (2013.01); *B60W 2030/1809* (2013.01); *B60W 2520/10* (2013.01); *B60W 2550/142* (2013.01); *F02N 2200/0801* (2013.01); *F02N 2200/124* (2013.01); *Y02T 10/48* (2013.01); *Y02T 10/6239* (2013.01); *Y02T 10/6286* (2013.01); *Y10S 903/93* (2013.01)

(58) Field of Classification Search
USPC ........................................................... 701/22
See application file for complete search history.

(56) References Cited

U.S. PATENT DOCUMENTS

| | | | |
|---|---|---|---|
| 5,832,400 A * | 11/1998 | Takahashi et al. ............... | 701/53 |
| 7,092,811 B2 * | 8/2006 | Ishizu et al. .................... | 701/93 |
| 7,396,317 B2 * | 7/2008 | Steen et al. .................... | 477/115 |
| 7,996,139 B2 * | 8/2011 | Okuda et al. .................... | 701/93 |
| 8,392,087 B2 * | 3/2013 | Kodama et al. ................. | 701/75 |

(Continued)

FOREIGN PATENT DOCUMENTS

| | | |
|---|---|---|
| JP | 2002-204504 A | 7/2002 |
| JP | 2008143426 A | 6/2008 |

(Continued)

*Primary Examiner* — Thomas Tarcza
*Assistant Examiner* — Alex C Dunn
(74) *Attorney, Agent, or Firm* — Sughrue Mion, PLLC

(57) ABSTRACT

A vehicle drive control device in a vehicle has an engine and an electric motor for running, the vehicle running with at least one of the engine and the electric motor for running used as a drive power source for running, the vehicle drive control device rotating the engine remaining in a no-drive state if a vehicle speed is equal to or greater than a predetermined determination vehicle speed during vehicle running with the engine in the no-drive state, the vehicle drive control device making the determination vehicle speed higher when a gradient of a running road surface on which the vehicle is running is larger, the gradient having a positive direction corresponding to descent.

7 Claims, 10 Drawing Sheets

(56) References Cited

U.S. PATENT DOCUMENTS

| | | |
|---|---|---|
| 8,775,040 B2 * | 7/2014 | Noumura et al. ............... 701/55 |
| 2004/0093144 A1 * | 5/2004 | Ishizu et al. ................... 701/93 |
| 2008/0154472 A1 * | 6/2008 | Okuda et al. ................... 701/93 |
| 2009/0043465 A1 * | 2/2009 | Tomita ............................ 701/51 |
| 2009/0063000 A1 * | 3/2009 | Kodama et al. ................. 701/75 |
| 2010/0121512 A1 | 5/2010 | Takahashi et al. |
| 2012/0089309 A1 * | 4/2012 | Kim et al. ....................... 701/58 |
| 2012/0168140 A1 * | 7/2012 | Yokkoyama et al. ......... 165/271 |
| 2012/0179342 A1 * | 7/2012 | Noumura et al. ............... 701/54 |

FOREIGN PATENT DOCUMENTS

| | | |
|---|---|---|
| JP | 200946020 A | 3/2009 |
| JP | 2009-126253 A | 6/2009 |
| JP | 2009-207267 A | 9/2009 |
| JP | 2009-274671 A | 11/2009 |
| JP | 2010-111321 A | 5/2010 |
| JP | 2012-153287 A | 8/2012 |

* cited by examiner

VEHICLE DRIVE CONTROL APPARATUS

CROSS REFERENCE TO RELATED APPLICATIONS

This application is a National Stage of International Application No. PCT/JP2011/065826 filed Jul. 11, 2011, the contents of which are incorporated herein by reference in their entirety.

TECHNICAL FIELD

The present invention relates to a technique of improving fuel efficiency of a hybrid vehicle.

BACKGROUND ART

A hybrid vehicle is recently more frequently seen that includes an engine and an electric motor for running to run with at least one of the engine and the electric motor for running used as a drive power source for running. A vehicle drive control device is conventionally well known that, when the vehicle in running with the engine in a no-drive state, performs motoring in which the engine is rotated in the no-drive state in the hybrid vehicle. For example, this corresponds to a control device of a hybrid vehicle disclosed in Patent Document 1. The control device of Patent Document 1 performs the motoring given that a vehicle speed is equal to or greater than a predetermined vehicle speed if an accelerator is turned off during running after selecting a power priority mode enabling running with emphasis on power performance rather than fuel efficiency performance. As a result, the engine can be started with good responsiveness to promptly increase drive power at the time of acceleration operation by a driver.

PRIOR ART DOCUMENT

Patent Document

Patent Document 1: Japanese Laid-Open Patent Publication No. 2009-126253

SUMMARY OF THE INVENTION

Problem to be Solved by the Invention

If the motoring is performed during vehicle running with the engine in the no-drive state, the engine can be started with good responsiveness in response to acceleration operation by a driver; however, on the other hand, since the motoring is performed by the electric motor for running or another electric motor, an increase in power consumption may cause fuel efficiency deterioration. The necessity of the motoring is considered to decrease on a downward slope because gravity originally generates a propelling force in a vehicle. However, since the control device of the Patent Document 1 performs the motoring based on a vehicle speed without giving consideration to a gradient of a running road surface on which the vehicle is running, the motoring may unnecessarily be performed on a downward slope, for example. Therefore, the control device of the Patent Document 1 has a room for further improvement in fuel efficiency with drivability deterioration suppressed. Such a problem is not known.

The present invention was conceived in view of the situations and it is therefore an object of the present invention to provide a vehicle drive control device capable of performing the motoring with fuel efficiency deterioration suppressed so as not to impair responsiveness to acceleration operation in a hybrid vehicle capable of running with an engine in the no-drive state.

Means for Solving the Problem

To achieve the object, the first aspect of the invention provides (a) a vehicle drive control device in a vehicle having an engine and an electric motor, the vehicle running with at least one of the engine and the electric motor used as a drive power source for running, the vehicle drive control device rotating the engine remaining in a no-drive state if a vehicle speed is equal to or greater than a predetermined vehicle speed during vehicle running with the engine in the no-drive state, (b) the vehicle drive control device making the predetermined vehicle speed higher when a gradient of a running road surface on which the vehicle is running becomes larger, the gradient having a positive direction corresponding to descent.

Effects of the Invention

The necessity of the motoring in which the engine is rotated in the no-drive state during the vehicle running with the engine in the no-drive state is lower on a downward slope as compared to a horizontal road surface in terms of ensuring the responsiveness to acceleration operation because of the propelling force acting on the vehicle due to gravity. On the other hand, the necessity is higher on an upward slope as compared to a horizontal road surface because of braking force acting on the vehicle due to gravity. With respect to this, in the first aspect of the invention where the determination vehicle speed is made higher when the gradient of the running road surface is larger, the gradient of the running road surface is taken into consideration such that the motoring is hardly performed on a downward slope having lower necessity of the motoring while the motoring is easily performed on an upward slope having higher necessity of the motoring. As a result, the motoring can be performed with fuel efficiency deterioration suppressed so as not to impair the responsiveness to acceleration operation. The gradient of the running road surface is zero when the running road surface is the horizontal road surface, a positive value in the case of a downward slope, or a negative value in the case of an upward slope. That is, when the upward slope is steeper, the gradient of the running road surface becomes smaller. The fuel efficiency refers to, for example, a running distance per unit fuel consumption etc., and improvement in fuel efficiency refers to extension of the running distance per unit fuel consumption, or reduction in fuel consumption rate (=fuel consumption/drive wheel output) of the vehicle as a whole. Contrarily, reduction in fuel efficiency (deterioration in fuel efficiency) refers to shortening of the running distance per unit fuel consumption or increase in fuel consumption rate of the vehicle as a whole.

The second aspect of the invention provides the vehicle drive control device recited in the first aspect of the invention, wherein a change rate of the determination vehicle speed to the gradient of the running road surface is larger when the gradient of the running road surface is closer to zero. Consequently, while the largest change in thrust force acting on the vehicle due to gravity occurs relative to a change in the gradient when the gradient of the running road surface is near zero (horizon), the determination vehicle speed can be changed in accordance with the magnitude of the thrust force due to the gravity corresponding to the gradient. As a result, the motoring can be performed without excess or shortage in accordance with the thrust force due to the gravity.

The third aspect of the invention provides the vehicle drive control device recited in the first or second aspect of the invention, wherein (a) during vehicle running in a motor running mode with the engine in the no-drive state and the electric motor for running used as the drive power source for running, if a request drive power requested to the vehicle increases, a running mode of the vehicle is switched from the motor running to engine running for running with at least the engine used as the drive power source for running, and wherein (b) during vehicle running in the motor running mode, when the gradient of the running road surface becomes larger, the motor running is maintained until the request drive power becomes larger. In this case, since a vehicle propelling force due to gravity increases when the gradient of the running road surface becomes larger, running performance is rarely impaired even if the motor running is accordingly performed until the request drive power becomes larger. Therefore, the third aspect of the invention can achieve an improvement in fuel efficiency by performing the motor running longer when the gradient of the running road surface is larger without impairing the running performance.

The fourth aspect of the invention provides the vehicle drive control device recited in the third aspect of the invention, wherein (a) if the request drive power is larger than a predetermined request drive power determination value, the running mode of the vehicle is set to the engine running, and wherein (b) when the gradient of the running road surface is larger, the request drive power determination value is made larger. Consequently, the request drive power determination value is decided based on the gradient of the running road surface, thereby easily adjusting the opportunities for performing the motor running and the opportunities for performing the engine running, and a control load may be reduced.

The fifth aspect of the invention provides the vehicle drive control device recited in the fourth aspect of the invention, wherein a change rate of the request drive power determination value to the gradient of the running road surface is larger when the vehicle speed is higher. Since electric motors have a generic property making the generation of high torque difficult during high-speed rotation, a higher vehicle speed, i.e., higher-speed rotation of the electric motor for running during the motor running makes the effect of the gradient of the running road surface on the whole vehicle propelling force relatively larger. In the fifth aspect of the invention, by taking the effect of the gradient of the running road surface, i.e., the effect of gravity, on the whole vehicle propelling force into consideration, the engine running and the motor running can alternately be switched so that both the fuel efficiency performance and the running performance can be satisfied over the whole change range of the vehicle speed.

The sixth aspect of the invention provides the vehicle drive control device recited in the first or second aspect of the invention, wherein (a) during vehicle running in a motor running mode with the engine in the no-drive state and the electric motor for running used as the drive power source for running, if a request drive power requested to the vehicle becomes larger than a predetermined request drive power determination value, a running mode of the vehicle is switched from the motor running to engine running for running with at least the engine used as the drive power source for running, wherein (b) the request drive power is determined such that when an accelerator opening degree becomes larger, the request drive power becomes larger, and wherein (c) the request drive power is determined such that when the gradient of the running road surface becomes larger, the request drive power becomes smaller. Consequently, the vehicle propelling force or the vehicle braking force due to gravity is taken into consideration so that the request drive power can be decided without excess or shortage. As a result, even if the gradient of the running road surface is different, a sufficiently large fuel efficiency improving effect from the motor running can be enjoyed without impairing the running performance of the vehicle.

The seventh aspect of the invention provides the vehicle drive control device recited in the sixth aspect of the invention, wherein the request drive power corresponding to the gradient of the running road surface is set to a value acquired by subtracting a propelling force in a traveling direction acting on the vehicle due to gravity from the request drive power when the running road surface is horizontal. Consequently, the request drive power with the effect of gravity taken into consideration can easily be calculated from the gradient of the running road surface.

Preferably, the change rate of the request drive power to the accelerator opening degree is made smaller when the gradient of the running road surface is larger.

Preferably, the vehicle includes an electric differential mechanism outputting power from the engine to drive wheels and having a differential state controlled by a differential electric motor.

MODE FOR CARRYING OUT THE INVENTION

An example of the present invention will now be described in detail with reference to the drawings.

First Example

Figure 1:
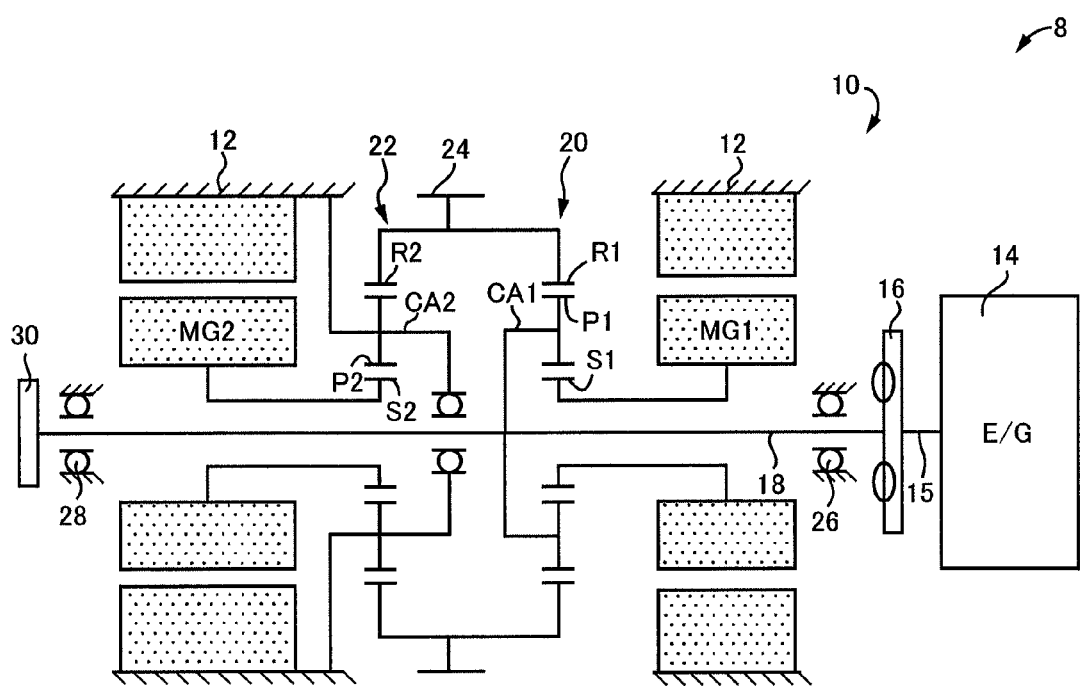
FIG. 1 is a schematic for explaining a vehicle drive device included in a vehicle to which the present invention is applied.

FIG. 1 is a schematic for explaining a vehicle drive device 8 included in a vehicle 6 to which the present invention is applied. The vehicle 6 is a hybrid vehicle running with at least one of an engine 14 and a second electric motor MG2 used as a drive power source for running. As depicted in FIG. 1, the vehicle drive device 8 includes the engine 14 that is a generally known automotive gasoline engine or diesel engine outputting power for running, and a vehicle power transmission device 10 (hereinafter referred to as a "power transmission device 10") interposed between the engine 14 and drive wheels 40 (see FIG. 2). The power transmission device 10 is a transaxle transmitting the power from the engine 14 to the drive wheels 40. The power transmission device 10 includes a damper 16 operatively coupled to an output shaft 15 (e.g., a crankshaft) of the engine 14 to absorb pulsation due to fluctuations of torque from the engine 14, an input shaft 18 rotationally driven via the damper 16 by the engine 14, a first electric motor MG1, a first planetary gear device 20 acting as a power distribution mechanism, a second planetary gear device 22 acting as a deceleration device, and the second electric motor MG2 coupled to the drive wheels 40 in a power transmittable manner, in this order from the engine 14 side in a transaxle (T/A) case 12 (hereinafter referred to as a "case 12") acting as a non-rotating member attached to a vehicle body.

The power transmission device 10 is transversely mounted on the front side of the front-wheel drive, i.e., FF (front-engine front-drive) type vehicle 6, for example, and is preferably used for driving the drive wheels 40. The power transmission device 10 transmits the power of the engine 14 from an output gear 24 acting as an output rotating member of the power transmission device 10 making up one of a counter gear pair 32, sequentially through the counter gear pair 32, a final gear pair 34, a differential gear device (final reduction gear) 36, a pair of axles 38, etc., to a pair of the drive wheels 40 (see FIG. 2). As described above, in this example, the input shaft 18 and the engine 14 are operatively coupled via the damper 16 and, although the output shaft 15 of the engine 14 is obviously an output rotating member of the engine 14, this input shaft 18 also corresponds to the output rotating member of the engine 14. As depicted in FIG. 1, the vehicle drive device 8 does not include a hydraulic power transmission device like a torque converter.

The input shaft 18 is rotatably supported at the both ends by ball bearings 26 and 28 and is coupled at one end via the damper 16 to the engine 14 and rotationally driven by the engine 14. The other end is coupled to an oil pump 30 acting as a lubrication oil supply device and, when the input shaft 18 is rotationally driven, the oil pump 30 is rotationally driven to supply lubrication oil to the portions of the power transmission device 10, for example, the first planetary gear device 20, the second planetary gear device 22, the ball bearings 26 and 28, etc.

The first planetary gear device 20 makes up a portion of a power transmission path between the engine 14 and the drive wheels 40 and is a differential mechanism outputting the power from the engine 14 to the drive wheels 40. The first planetary gear device 20 acts as an electric differential mechanism having a differential state controlled by the first electric motor MG1. Specifically, the first planetary gear device 20 is a single pinion type planetary gear device and includes a first sun gear S1, a first pinion gear P1, a first carrier CA1 supporting the first pinion gear P1 in a rotatable and revolvable manner, and a first ring gear R1 meshing via the first pinion gear P1 with the first sun gear S1, as rotating elements (elements). When $Z_{S1}$ denotes the number of teeth of the first sun gear S1 and $Z_{R1}$ denotes the number of teeth of the first ring gear R1, a gear ratio $\rho 1$ of the first planetary gear device 20 is calculated as "$\rho 1 = Z_{S1}/Z_{R1}$".

The first planetary gear device 20 is a mechanical power distribution mechanism mechanically distributing an output of the engine 14 transmitted to the input shaft 18 and distributes the output of the engine 14 to the first electric motor MG1 and the output gear 24. Therefore, in the first planetary gear device 20, the first carrier CA1 acting as a first rotating element is coupled to the input shaft 18, i.e., the engine 14; the first sun gear S1 acting as a second rotating element is coupled to the first electric motor MG1; and the first ring gear R1 acting as a third rotating element is coupled to the output gear 24, i.e., the drive wheels 40 operatively coupled to the output gear 24. As a result, since the first sun gear S1, the first carrier CA1, and the first ring gear R1 become relatively rotatable to each other, the output of the engine 14 is distributed to the first electric motor MG1 and the output gear 24 while the output of the engine 14 distributed to the first electric motor MG1 causes the first electric motor MG1 to generate electricity and, because the generated electric energy is accumulated or the electric energy rotationally drives the second electric motor MG2, the power transmission device 10 is put into, for example, a continuously variable transmission state (electric CVT state) to function as an electric continuously variable transmission having the rotation of the output gear 24 continuously varied regardless of a predetermined rotation of the engine 14 when the differential state of the first planetary gear device 20 is controlled by the first electric motor MG1. Since the power transmission between the first carrier CA1 and the first ring gear R1 is interrupted in the first planetary gear device 20 when the first electric motor MG1 is put into a no-load state and allowed to idle, the first planetary gear device 20 also acts as a power transmission interruption device capable of interrupting the power transmission between the engine 14 and the drive wheels 40.

The second planetary gear device 22 is a single pinion type planetary gear device. The second planetary gear device 22 includes a second sun gear S2, a second pinion gear P2, a second carrier CA2 supporting the second pinion gear P2 in a rotatable and revolvable manner, and a second ring gear R2 meshing via the second pinion gear P2 with the second sun gear S2, as rotating elements. The ring gear R1 of the first planetary gear device 20 and the ring gear R2 of the second planetary gear device 22 are formed as an integrated compound gear having the output gear 24 disposed on the outer circumferential portion thereof. Therefore, in this example, a rotation speed Nr1 of the ring gear R1, a rotation speed Nr2 of the ring gear R2, and a rotation speed Nout of the output gear 24 are the same with each other.

In the second planetary gear device 22, the second carrier CA2 is coupled to the case 12 that is the non-rotating member and is prevented from rotating; the second sun gear S2 is coupled to the second electric motor MG2; and the second ring gear R2 is coupled to the output gear 24. Therefore, the second electric motor MG2 is coupled to the output gear 24 and the ring gear R1 of the first planetary gear device 20 via the second planetary gear device 22. As a result, for example, at the time of start etc., the second sun gear S2 is rotated by rotational drive of the second electric motor MG2 and the rotation is decelerated by the second planetary gear device 22 and transmitted to the output gear 24.

Both the first electric motor MG1 and the second electric motor MG2 of this example are so-called motor generators having an electric generation function as well. Specifically, the first electric motor MG1 and the second electric motor MG2 are synchronous motor generators including a rotor having a plurality of circumferentially arranged permanent magnets and a rotation shaft, and a stator that is a non-rotating member wound with a three-phase coil forming a rotating magnetic field around a rotation axis. In the first electric motor MG1 and the second electric motor MG2, the rotor is rotationally driven by interaction between a magnetic field generated by the plurality of the permanent magnets and a magnetic field generated by the three-phase coil, or an electromotive force is generated by the interaction thereof between terminals of the three-phase coil. Because of such a configuration, when a larger drive current is applied to the three-phase coil, the first electric motor MG1 and the second electric motor MG2 generate greater torque. Each of the first electric motor MG1 and the second electric motor MG2 is electrically connected via an inverter 54 (see FIG. 2) to an electric storage device 56, and the first electric motor MG1, the second electric motor MG2, and the electric storage device 56 are configured such that electric power can be supplied/received to/from each other. The first electric motor MG1 acts as a differential electric motor and at least has a generator (electric generation) function for generating a reaction force. The second electric motor MG2 acts as an electric motor for running, at least has a motor (electric motor) function for outputting drive power of the vehicle 6, and outputs the power for running to the drive wheels 40. For example, the electric storage device 56 is a battery (secondary battery) such as a lead storage battery or a capacitor and is an electric energy source capable of supplying electric power to the first electric motor MG1 and the second electric motor MG2 and being supplied with electric power from each of the electric motors MG1 and MG2.

Figure 3:
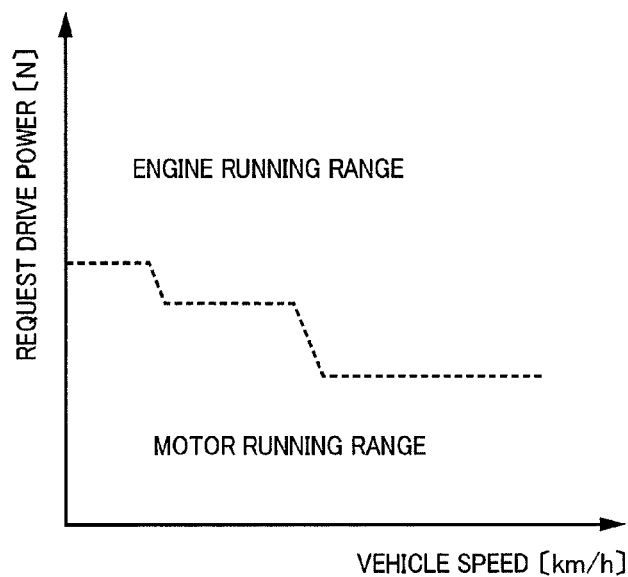
FIG. 3 is a diagram of a running range map used for switching the running mode to either of the motor running and the engine running in the vehicle including the vehicle drive device of FIG. 1.
Figure 4:
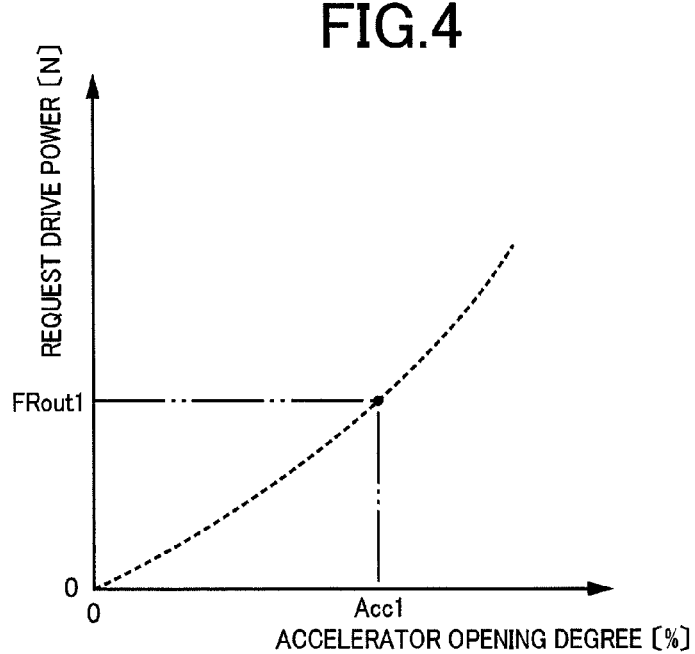
FIG. 4 is a diagram of a request drive power map used for determining the request drive power based on the accelerator opening degree in the vehicle including the vehicle drive device of FIG. 1.

In the vehicle drive device 8 configured as described above, for example, after a key is inserted into a key slot, when a power switch is operated to activate the control while a foot brake 45 is subjected to depressing operation, an electronic control device 60 (see FIG. 2) generates output corresponding to an accelerator opening degree (accelerator operation amount) Acc, i.e., an operation amount of an accelerator pedal 41 (see FIG. 2) depressed at the time of acceleration operation by a driver, from the engine 14 and/or the second electric motor MG2. For example, the electronic control device 60 alternatively switches a running mode of the vehicle 6 to motor running (also referred to as EV running) for running with the engine 14 put into no-drive state and the second electric motor MG2 used as the drive power source for running, engine running for running with at least the engine 14 used as the drive power source for running, etc., depending on running state of the vehicle 6 indicated by a request drive power FRout requested to the vehicle 6 and vehicle speed V, for example. In this example, a running range map is made up of a motor running range for performing the motor running and an engine running range for performing the engine running as depicted in FIG. 3 and is empirically set in advance such that fuel efficiency performance and running performance of the vehicle 6 can be maintained at higher levels. The running range map is a map for determining the switching of the running mode of the vehicle 6 by using the vehicle speed V and the request drive power FRout as parameters and the running range map has the engine running range disposed on the larger side of the request drive power FRout relative to the motor running range. For example, the electronic control device 60 switches the running mode of the vehicle 6 to the engine running if the running state of the vehicle 6 indicated by the vehicle speed V and the request drive power FRout belongs to the engine running range, and switches the running mode of the vehicle 6 to the motor running if the running state of the vehicle 6 belongs to the motor running range. The electronic control device 60 determines the request drive power FRout based on the accelerator opening degree Acc from a request drive power map that is relationship set in advance as depicted in FIG. 4, for example. Therefore, as depicted in FIG. 4, the request drive power FRout is determined to be larger when the accelerator opening degree Acc is larger. For example, if the accelerator opening degree Acc is Acc1 in FIG. 4, the request drive power FRout is determined as FRout1. The request drive power map is empirically defined in advance such that the drive power consistent with driver's intention is generated based on the accelerator opening degree Acc. The electronic control device 60 controls the drive power source for running such that the drive power of the vehicle 6 matches the request drive power FRout regardless of whether the running mode is the motor running or the engine running. Therefore, the request drive power FRout is a target drive power that is a target value of the drive power of the vehicle 6. The no-drive state of the engine 14 is a state in which the engine 14 is not driven, i.e., a state in which fuel supply to the engine 14 is interrupted or a state in which engine ignition is not performed, and is irrelevant to whether the output shaft 15 of the engine 14 is rotating. The drive power (e.g., in "N") of the vehicle 6 is a propelling force of the vehicle 6 transmitted from the drive wheels 40 to a running road surface 74.

Specifically, if the running mode of the vehicle 6 is the engine running, i.e., in the engine running mode for performing the engine running, the electronic control device 60 puts the engine 14 into drive state to make the vehicle 6 run. The electronic control device 60 controls a gear ratio γ0 (=rotation speed of the input shaft 18/rotation speed of the output gear 24) of the first planetary gear device 20 through the first electric motor MG1 in a stepless manner such that the engine 14 operates in accordance with a predetermined operation curve such as an optimum fuel efficiency curve, for example. In the engine running mode, the second electric motor MG2 may also be put into the drive state along with the engine 14 as needed so that the second electric motor MG2 outputs an assist torque. Therefore, the engine running mode allows only the engine 14, or the engine 14 and the second electric motor MG2, to act as the drive power source for running.

Backward running of the vehicle 6 is achieved by rotationally driving the second electric motor MG2 in opposite direction, for example. In this case, the electronic control device 60 puts the first electric motor MG1 into an idling state to allow the output gear 24 to rotate in opposite direction regardless of the drive state or the no-drive state of the engine 14.

During coast running that is inertial running with the acceleration operation released, the electronic control device 60 rotationally drives the second electric motor MG2 with inertial energy of the vehicle 6 to regenerate the energy as electric power and stores the electric power into the electric storage device 56. In short, during the coast running, deceleration regenerative running is performed in which the vehicle 6 is decelerated by the regenerative operation of the second electric motor MG2. During the deceleration regenerative running, the electronic control device 60 puts the engine 14 into the no-drive state so as to suppress the fuel consumption of the engine 14.

If the running mode of the vehicle 6 is the motor running, i.e., in the motor running mode (also referred to as EV running mode) for performing the motor running, the electronic control device 60 drives the second electric motor MG2 with electric power from the electric storage device 56 while operation of the engine 14 is stopped, i.e., in the no-drive state, and uses only the second electric motor MG2 as the drive power source for running. In the motor running mode, to suppress a drag of the engine 14 stopped operating, thus to improve fuel efficiency for example, the first electric motor MG1 is put into a no-load state and allowed to idle so that a rotation speed Ne of the engine 14 (hereinafter referred to as an engine rotation speed Ne) is maintained at zero or substantially zero by differential effect of the first planetary gear device 20. However, during the motor running or the deceleration regenerative running, i.e., during vehicle running with the engine 14 in the no-drive state, the electronic control device 60 may perform motoring in which the engine 14 is rotated in the no-drive state, so as to improve responsiveness of engine start. The motoring of the engine 14 will be described later.

Figure 2:
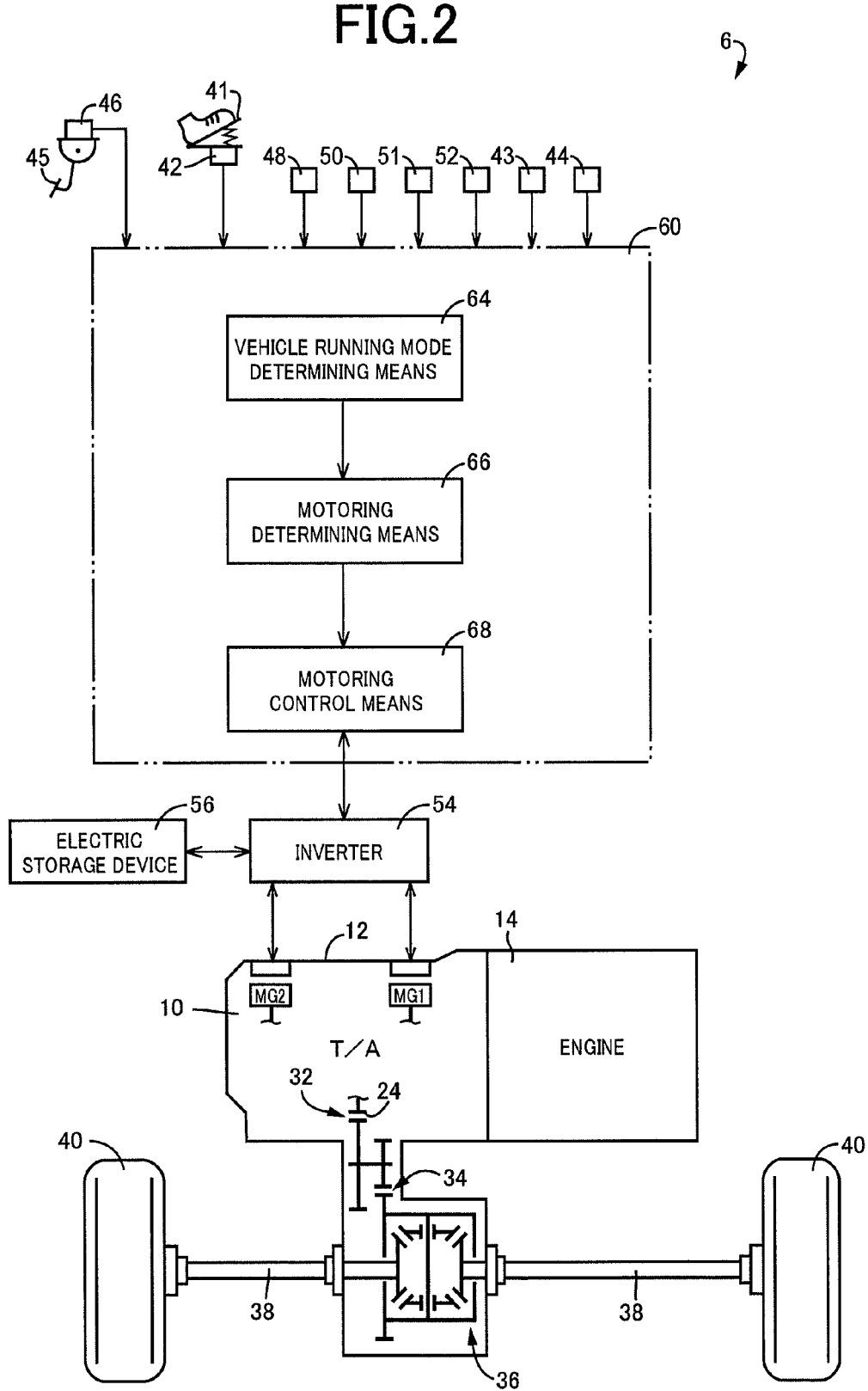
FIG. 2 is a diagram exemplarily illustrating signals input to an electronic control device acting as a vehicle drive control device for controlling the vehicle drive device of FIG. 1 and is a functional block diagram of a first example for explaining a main portion of the control function included in the electronic control device.

FIG. 2 is a diagram exemplarily illustrating signals input to the electronic control device 60 acting as a vehicle drive control device for controlling the vehicle drive device 8 of this example and is a functional block diagram for explaining a main portion of the control function included in the electronic control device 60. The electronic control device 60 includes a so-called microcomputer made up of a CPU, a ROM, a RAM, and an input/output interface, and executes signal processes in accordance with programs stored in advance in the ROM, while utilizing a temporary storage function of the RAM, to provide the vehicle control such as hybrid drive control related to the engine 14, the first electric motor MG1, and the second electric motor MG2.

Figure 5:
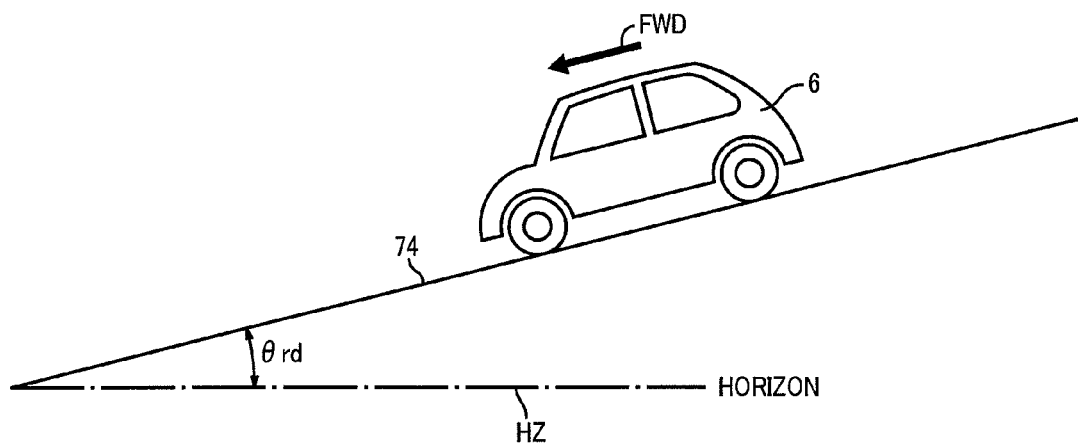
FIG. 5 is a diagram for explaining a running road surface gradient which is the gradient of the running road surface on which the vehicle including the vehicle drive device of FIG. 1 is currently running.

The electronic control device 60 is supplied, from sensors, switches, etc., as depicted in FIG. 2, with a signal indicative of an engine water temperature $TEMP_w$ from an engine water temperature sensor 51 disposed on a cylinder block of the engine 14; a signal from an engine rotation speed sensor 50 indicative of the engine rotation speed Ne; a signal from a vehicle speed sensor 52 indicative of the vehicle speed V corresponding to the rotation speed Nout of the output gear 24 (hereinafter referred to as an "output rotation speed Nout"); a signal indicative of a foot brake operation from a brake switch 46 for detecting the presence/absence of operation of the foot brake 45 that is a regular brake; a signal from an accelerator opening degree sensor 42 indicative of the accelerator opening degree Acc that is an operation amount of the accelerator pedal 41 corresponding to the request drive power FRout requested from a driver to the vehicle 6; a signal from a throttle valve opening degree sensor 43 indicative of a throttle valve opening degree θth of an electronic throttle valve disposed in an intake pipe of the engine 14 and electrically-driven to adjust an intake air amount of the engine 14; a signal indicative of a running road surface gradient θrd from a road surface gradient sensor 44 detecting a gradient θrd of the running road surface 74 (see FIG. 5) on which the vehicle 6 is currently running (hereinafter referred to as the running road surface gradient θrd); a signal indicative of a rotation speed Ng of the first electric motor MG1 (hereinafter referred to as a "first electric motor rotation speed Ng"); a signal indicative of a rotation speed Nm of the second electric motor MG2 (hereinafter referred to as a "second electric motor rotation speed Nm"); a signal indicative of a charge remaining amount (state of charge) SOC of the electric storage device 56; a shift lever position signal corresponding to an operation position $P_{OPE}$ from a lever operation position sensor 48 that is a position sensor for detecting an operation position $P_{OPE}$ of a shift lever; a signal indicative of a drive current of the first electric motor MG1 corresponding to a torque Tg of the first electric motor MG1 (hereinafter referred to as a "first electric motor torque Tg"); a signal indicative of a drive current of the second electric motor MG2 corresponding to a torque Tm of the second electric motor MG2 (hereinafter referred to as a "second electric motor torque Tm"), etc. The running road surface gradient θrd (e.g., in "degrees") in this example is an angel relative to a horizontal surface HZ when a positive direction corresponds to descent of the running road surface 74 as depicted in FIG. 5, in which a travelling direction of the vehicle 6 is indicated by an arrow FWD. Therefore, the running road surface gradient θrd is zero when the running road surface 74 is the horizontal road surface, a positive value in the case of a downward slope, or a negative value in the case of an upward slope.

The electronic control device 60 outputs control signals for engine output control for controlling the engine output, for example, a drive signal to a throttle actuator operating the throttle valve opening degree θth of the electronic throttle valve; a fuel supply amount signal controlling an amount of fuel supply into the intake pipe by a fuel injection device of the engine 14 or into a cylinder of the engine 14; an ignition signal specifying the timing of ignition of the engine 14 by an ignition device of the engine 14; a command signal commanding the operations of the electric motors MG1 and MG2; etc. In throttle control for adjusting the throttle valve opening degree θth depending on the accelerator opening degree Acc, the electronic control device 60 increases the throttle valve opening degree θth as the accelerator opening degree Acc increases. The intake air amount sucked into the engine 14 also increases in association with the increase in the throttle valve opening degree θth.

During the vehicle running with the engine 14 in the no-drive state, specifically during the motor running or the deceleration regenerative running, if the acceleration operation is performed by depressing the accelerator pedal 41, the engine 14 is started to perform the engine running depending on the accelerator opening degree Acc at this point. In this example, to improve the responsiveness of the engine start during the vehicle running with the engine 14 in the no-drive state, the motoring may be performed. A main portion of the control function for performing the motoring will be described with reference to FIG. 2. As depicted in FIG. 2, the electronic control device 60 includes a vehicle running mode determining means 64 as a vehicle running mode determining portion, a motoring determining means 66 as a motoring determining portion, and a motoring control means 68 as a motoring control portion.

The vehicle running mode determining means 64 determines whether the vehicle 6 is during the vehicle running with the engine 14 in the no-drive state, or specifically, whether or not the vehicle 6 is during the motor running or the deceleration regenerative running. For example, this is determined from a fuel supply situation to the engine 14 or an ignition situation of the engine 14, and the vehicle speed V etc.

Figure 6:
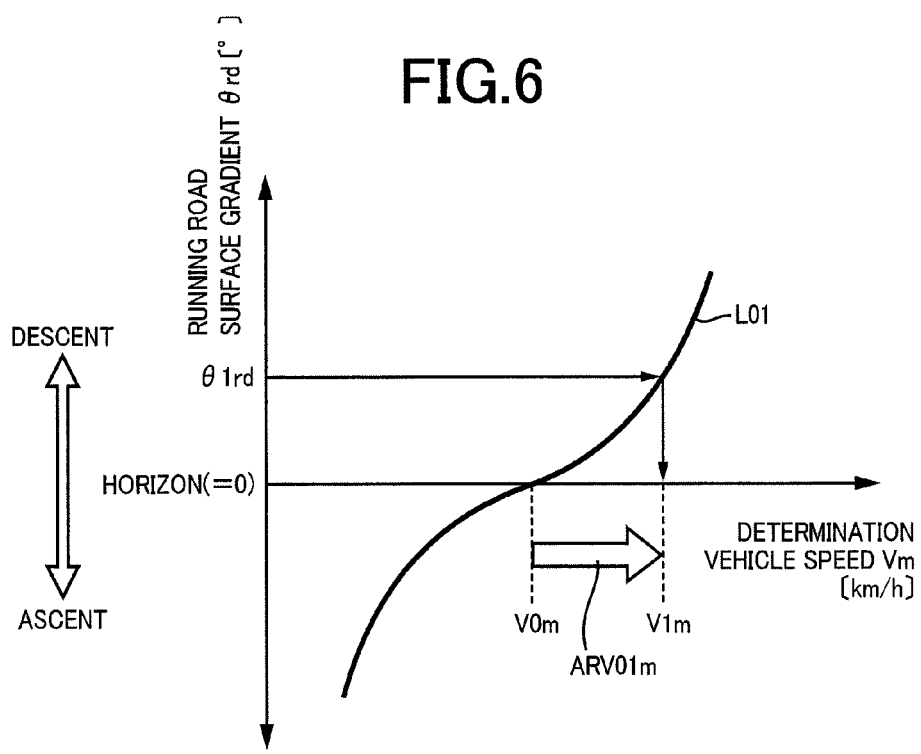
FIG. 6 is a diagram of a determination vehicle speed map used for deciding the determination vehicle speed for determining whether the motoring of the engine is performed, based on the running road surface gradient in the vehicle including the vehicle drive device of FIG. 1.

If the vehicle running mode determining means 64 determines that the vehicle 6 is during the vehicle running with the engine 14 in the no-drive state, the motoring determining means 66 sequentially determines whether the motoring needs to be performed, based on the vehicle speed V. For this determination, a determination vehicle speed Vm used as a threshold value compared with the vehicle speed V must be decided based on the running road surface gradient θrd. Therefore, first, the motoring determining means 66 acquires the running road surface gradient θrd detected by the road surface gradient sensor 44. The motoring determining means 66 then decides the determination vehicle speed Vm based on the acquired running road surface gradient θrd from a determination vehicle speed map that is relationship defined in advance between the running road surface gradient θrd and the determination vehicle speed Vm. An example of the determination vehicle speed map is depicted in FIG. 6. Since the determination vehicle speed Vm becomes larger when the running road surface gradient θrd is larger in the determination vehicle speed map of FIG. 6, the motoring determining means 66 sets the determination vehicle speed Vm higher when the acquired running road surface gradient θrd is larger in accordance with the determination vehicle speed map. For example, if the acquired running road surface gradient θrd is θ1rd in FIG. 6, the determination vehicle speed Vm is decided as V1m. Therefore, when the vehicle 6 is running on the running road surface 74 having the running road surface gradient θrd of θ1rd, the determination vehicle speed Vm is decided higher than V0m, which is the determination vehicle speed Vm on the horizontal road surface, by an arrow ARV01m and, as a result, the opportunities for performing the motoring are reduced. As can be seen from FIG. 6, in the relationship between the running road surface gradient θrd and the determination vehicle speed Vm decided by the motoring determining means 66, a change rate of the determination vehicle speed Vm to the running road surface gradient θrd is larger when the running road surface gradient θrd is closer to zero (horizon). The change rate of the determination vehicle speed Vm to the running road surface gradient θrd is a gradient of a solid line L01 based on the vertical axis of FIG. 6 in the case of the determination vehicle speed map depicted in FIG. 6. The determination vehicle speed Vm is a predetermined determination value decided as indicated in the determination vehicle speed map of FIG. 6 for determining whether the motoring is performed. The determination vehicle speed map of FIG. 6 is a map empirically set in advance for deciding the determination vehicle speed Vm such that the responsiveness of engine start from the motoring is properly acquired while the fuel efficiency deterioration due to the motoring is suppressed.

When the determination vehicle speed Vm is decided based on the running road surface gradient θrd, the motoring determining means 66 determines whether the current vehicle speed V is equal to or greater than the determination vehicle speed Vm. As a result of determination, if the vehicle speed V is equal to or greater than the determination vehicle speed Vm, the motoring determining means 66 determines that the motoring needs to be performed. On the other hand, if the vehicle speed V is less than the determination vehicle speed Vm, the motoring determining means 66 determines that the motoring does not need to be performed.

The motoring control means 68 performs the motoring depending on the vehicle speed V during the vehicle running with the engine 14 in the no-drive state. Specifically, if the motoring determining means 66 determines that the motoring needs to be performed i.e., if the vehicle speed V is equal to or greater than the determination vehicle speed Vm, the motoring is performed. On the other hand, if the motoring determining means 66 determines that motoring does not need to be performed i.e., if the vehicle speed V is less than the determination vehicle speed Vm, the motoring is not performed and the first electric motor MG1 is allowed to idle so as to maintain the engine rotation speed Ne at zero or substantially zero.

Figure 7:
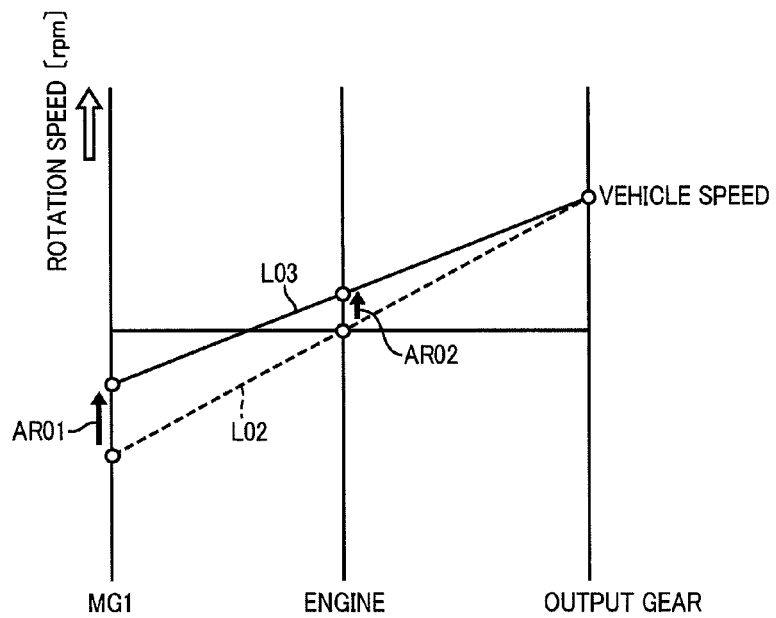
FIG. 7 is a collinear diagram of a differential state of a first planetary gear device during the vehicle running with the engine of FIG. 1 in the no-drive state.

FIG. 7 is a collinear diagram of a differential state of the first planetary gear device 20 during the vehicle running with the engine 14 in the no-drive state and depicts the first electric motor rotation speed Ng, the engine rotation speed Ne, and the rotation speed Nout of the output gear 24 (the output rotation speed Nout) from left. A broken line L02 indicates a differential state of the first planetary gear device 20 when the motoring is not performed with the first electric motor MG1 allowed to idle. A solid line L03 indicates a differential state of the first planetary gear device 20 when the motoring is performed.

As depicted in FIG. 7, when the motoring is performed, the motoring control means 68 raise the rotation speed Ng of the first electric motor MG1 in the idle state in the positive direction same as the engine rotation as indicated by an arrow AR01 to increase the engine rotation speed Ne as indicated by an arrow AR02. In this case, although the rotation speed Nout of the output gear 24 and the second electric motor rotation speed Nm are bound to the vehicle speed V and therefore are not changed before and after the execution of the motoring, the motoring control means 68 causes the first electric motor MG1 to generate a torque in the positive direction so as to rotate the engine 14 and also causes the second electric motor MG2 to generate a torque so as to prevent the vehicle speed V from decreasing due to the rotation resistance of the engine 14 during the motoring. The motoring control means 68 controls the first electric motor rotation speed Ng such that the engine rotation speed Ne converges to a motoring-time target rotation speed set in advance to a constant value on the order of an idling rotation speed of the engine 14. As described above, if the motoring control means 68 performs the motoring of the engine 14, for example, when the accelerator pedal 41 is depressed, the engine 14 can rapidly be started as compared to the case without performing the motoring, and the drive power can be increased early.

Figure 8:
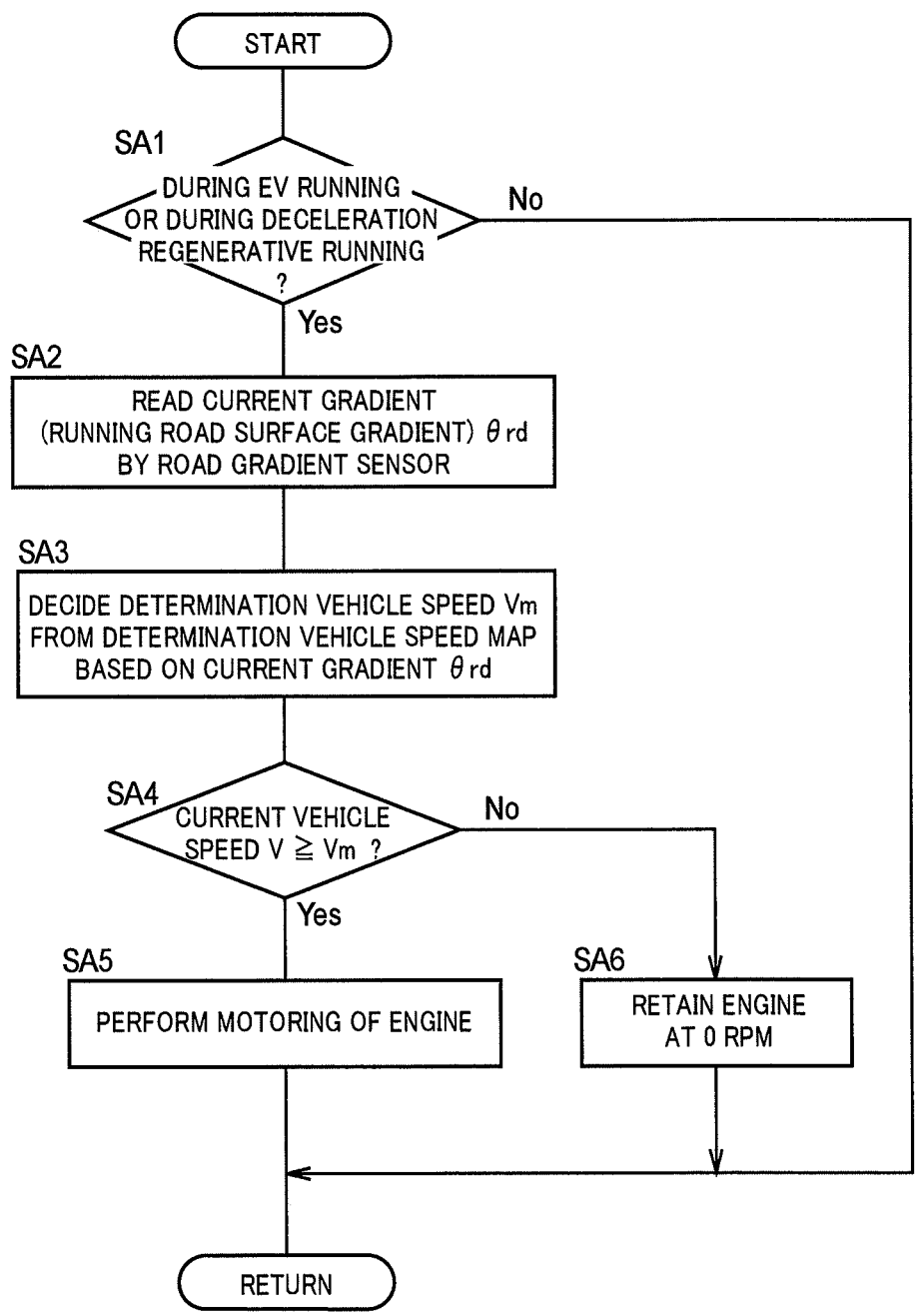
FIG. 8 is a flowchart of the first example for explaining a main portion of the control operation of the electronic control device of FIG. 2, i.e., the control operation of performing the motoring during the vehicle running with the engine in the no-drive state.

FIG. 8 is a flowchart for explaining a main portion of the control operation of the electronic control device 60, i.e., the control operation of performing the motoring during the vehicle running with the engine 14 in the no-drive state and is repeatedly executed with an extremely short cycle time, for example, on the order of a few msec to a few tens of msec. The control operation depicted in FIG. 8 is performed solely or concurrently with another control operation.

First, at step (hereinafter, "step" will be omitted) SA1 corresponding to the vehicle running mode determining means 64, it is determined whether the vehicle 6 is during the vehicle running with the engine 14 in the no-drive state. Specifically, it is determined whether or not the vehicle 6 is during the motor running (EV running) or the deceleration regenerative running. If the determination of SA1 is affirmative, i.e., if the vehicle 6 is during the motor running or the deceleration regenerative running, the operation goes to SA2. On the other hand, if the determination of SA1 is negative, this flowchart is terminated.

At SA2, the running road surface gradient θrd detected by the road surface gradient sensor 44 is read and acquired. SA2 is followed by SA3.

At SA3, the determination vehicle speed Vm corresponding to the running road surface gradient θrd acquired at SA2 is read from the determination vehicle speed map of FIG. 6. In other words, the determination vehicle speed Vm is decided from the determination vehicle speed map of FIG. 6 based on the running road surface gradient θrd acquired at SA2. SA3 is followed by SA4.

At SA4, the current vehicle speed V is detected by the vehicle speed sensor 52 and it is determined whether the vehicle speed V is equal to or greater than the determination vehicle speed Vm decided at SA3. If the determination of SA4 is affirmative, i.e., if the vehicle speed V is equal to or greater than the determination vehicle speed Vm, the operation goes to SA5. On the other hand, the determination of SA4 is negative, the operation goes to SA6. SA2 to SA4 correspond to the motoring determining means 66.

At SA5, the motoring of the engine 14 is performed. If the motoring is already being performed, the motoring is continued.

At SA6, the motoring is not performed. Therefore, the first electric motor MG1 is allowed to idle so as to maintain the engine rotation speed Ne at zero or substantially zero. If the first electric motor MG1 is already allowed to idle, the idle state of the first electric motor MG1 is continued. SA5 and SA6 correspond to the motoring control means 68.

This example has the following effects (A1) and (A2). (A1) According to this example, the motoring determining means 66 sets the determination vehicle speed Vm higher when the gradient θrd is larger that has a positive direction corresponding to descent of the running road surface 74 on which the vehicle 6 is running i.e., when the running road surface gradient θrd is larger, in accordance with the determination vehicle speed map of FIG. 6. If the vehicle speed V is equal to or greater than the determination vehicle speed Vm during the vehicle running with the engine 14 in the no-drive state, the motoring control means 68 performs the motoring in which the engine 14 is rotated in the no-drive state. The necessity of the motoring during the vehicle running with the engine 14 in the no-drive state is lower on a downward slope as compared to a horizontal road surface in terms of ensuring the responsiveness to acceleration operation because of the propelling force acting on the vehicle 6 due to gravity. On the other hand, the necessity is higher on an upward slope as compared to a horizontal road surface because of the braking force acting on the vehicle 6 due to gravity. Therefore, when a determination is made on whether the motoring is performed, the running road surface gradient θrd is taken into consideration such that the motoring is hardly performed on a downward slope having lower necessity of the motoring while the motoring is easily performed on an upward slope having higher necessity of the motoring. As a result, the motoring can be performed with fuel efficiency deterioration suppressed so as not to impair the responsiveness to acceleration operation. In short, the engine output can be acquired without excess or shortage relative to the acceleration operation.

(A2) According to this example, as can be seen from FIG. 6, in the relationship between the running road surface gradient θrd and the determination vehicle speed Vm decided by the motoring determining means 66, a change rate of the determination vehicle speed Vm to the running road surface gradient θrd is larger when the running road surface gradient θrd is closer to zero. Therefore, while the largest change in thrust force acting on the vehicle 6 due to gravity, i.e., thrust force due to the self-weight of the vehicle 6 occurs relative to a change in the running road surface gradient θrd when the running road surface gradient θrd is near zero (horizon), the determination vehicle speed Vm can be changed in accordance with the magnitude of the thrust force due to the self-weight corresponding to the running road surface gradient θrd. As a result, the motoring can be performed without excess or shortage in accordance with the thrust force due to the self-weight.

Another example of the present invention will be described. In the following description, the portions mutually common to the examples are denoted by the same reference numerals and will not be described.

Second Example

Figure 9:
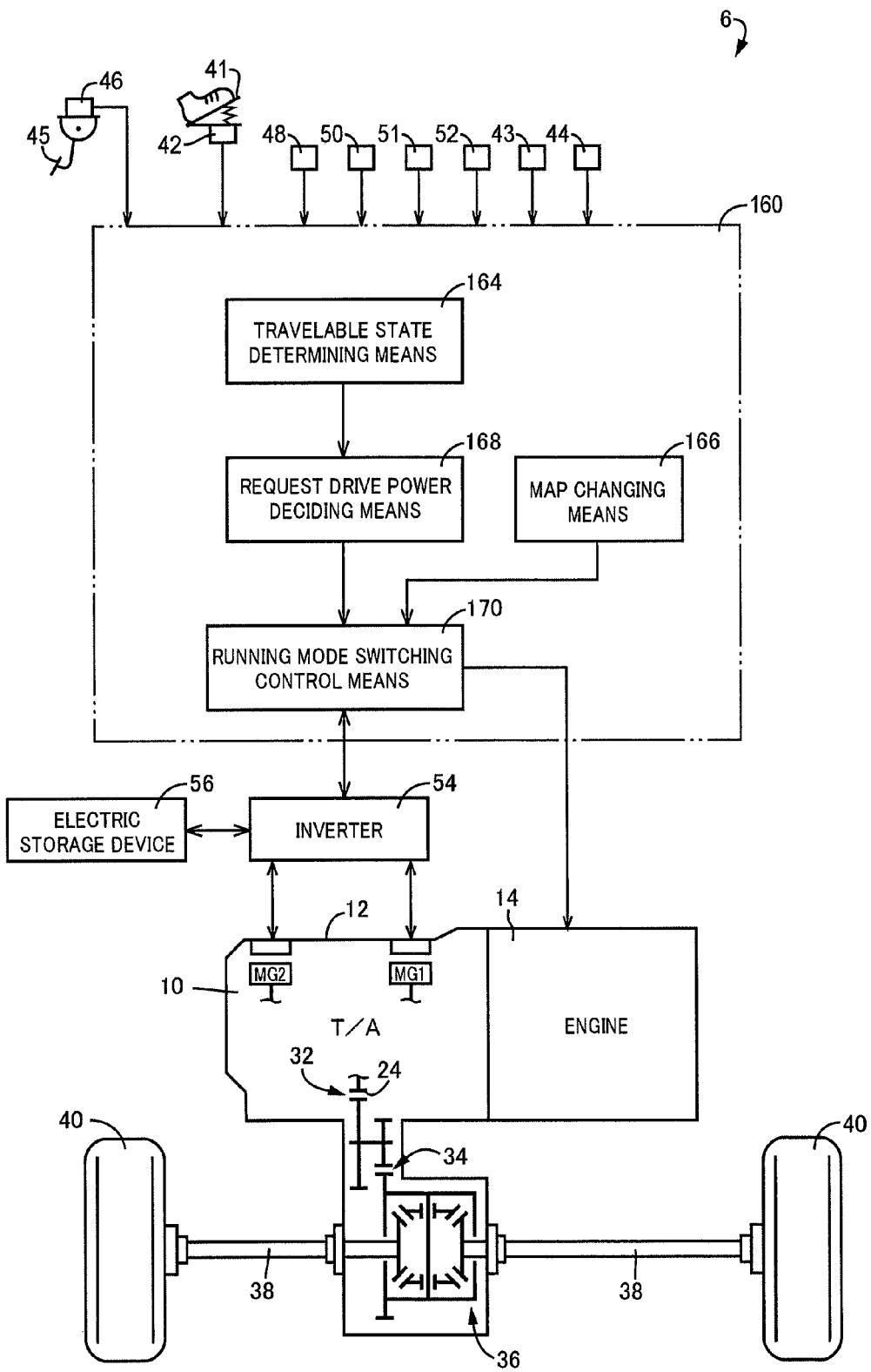
FIG. 9 is a functional block diagram for explaining a main portion of the control function included in an electronic control device of a second example.

In the description of this example (second example), the points different from the first example will mainly be described without describing the points common with the first example. This example is different from the first example in that the running range map depicted in FIG. 3 or the request drive power map depicted in FIG. 4 is changed depending on the running road surface gradient θrd so as to increase the opportunities for performing the motor running when the running road surface gradient θrd is larger. A main portion of the control function will be described with reference to FIG. 9. FIG. 9 is a functional block diagram for explaining the main portion of the control function included in an electronic control device 160 of this example. As depicted in FIG. 9, the electronic control device 160 includes a travelable state determining means 164 as a travelable state determining portion, a map changing means 166 as a map changing portion, a request drive power deciding means 168 as a request drive power deciding portion, and a running mode switching control means 170 as a running mode switching control portion.

The travelable state determining means 164 sequentially determines whether the vehicle 6 is in a travelable state in which the vehicle 6 can immediately start/run if a driver depresses the accelerator pedal 41. In other words, the travelable state is a state in which the drive power corresponding to the accelerator opening degree Acc is generated if the accelerator pedal 41 is depressed. For example, after a key is inserted into a key slot, when a power switch is operated while the foot brake 45 is subjected to the depressing operation, the vehicle 6 turns to the travelable state from another state such as an ignition-off state.

Figure 10:
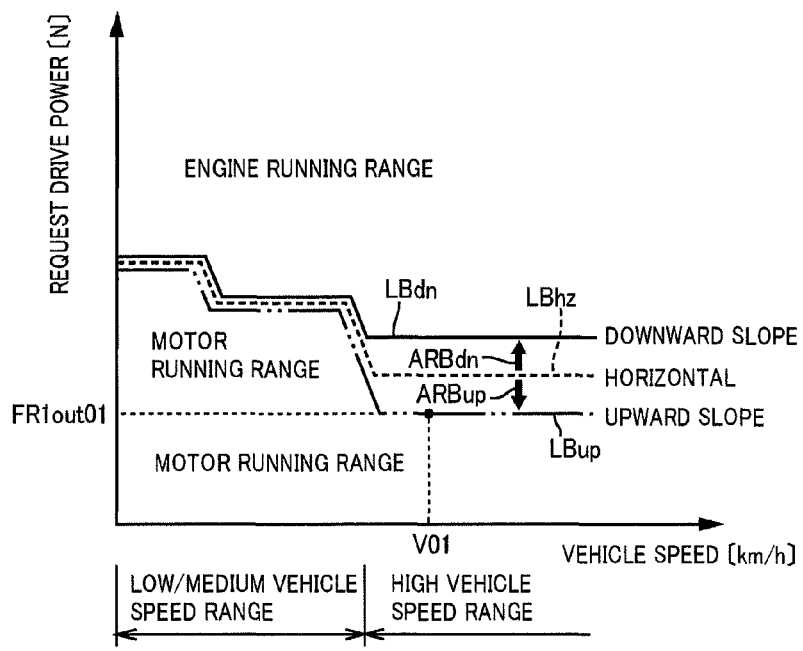
FIG. 10 is a diagram of an example of changing the running range map depicted in FIG. 3 depending on the running road surface gradient.

The map changing means 166 sequentially changes the running range map based on the running road surface gradient θrd. Therefore, the map changing means 166 acquires the running road surface gradient θrd detected by the road surface gradient sensor 44. When the running road surface gradient θrd is larger, the map changing means 166 expands the motor running range making up the running range map to the larger side of the request drive power FRout. An example for explaining this operation is depicted in FIG. 10. FIG. 10 is a diagram of an example of changing the running range map depicted in FIG. 3 depending on the running road surface gradient θrd. For example, as depicted in FIG. 10, for the running range map when the running road surface gradient θrd is zero, i.e., horizontal, the map changing means 166 does not change a running range boundary line (a solid line LBdn, a broken line LBhz, or a dashed-two dotted line LBup) between the motor running range and the engine running range depending on the running road surface gradient θrd in a low/medium vehicle speed range. On the other hand, only in a high vehicle speed range, the map changing means 166 shifts the running range boundary line to the larger side of the request drive power FRout when the running road surface gradient θrd is larger, thereby expanding the motor running range to the larger side of the request drive power FRout. For example, in FIG. 10, since the running road surface gradient θrd of a downward slope is larger as compared to the horizontal road surface, the solid line LBdn indicative of the running range boundary line of a downward slope with a certain gradient is shifted to the larger side of the request drive power FRout as indicated by an arrow ARBdn relative to the broken line LBhz indicative of the running range boundary line of the horizontal road surface. Since the running road surface gradient θrd of an upward slope is smaller as compared to the horizontal road surface, the dashed-two dotted line LBup indicative of the running range boundary line of an upward slope with a certain gradient is shifted to the smaller side of the request drive power FRout as indicated by an arrow ARBup relative to the running range boundary line LBhz of the horizontal road surface. A shift width of the running range boundary line corresponding to the running road surface gradient θrd is empirically set in advance such that the fuel efficiency performance and the running performance can be maintained at higher levels. The low/medium vehicle speed range of FIG. 10 is depicted with the solid line LBdn, the broken line LBhz, and the dashed-two dotted line LBup shifted from each other so as to prevent the lines from overlapping with each other and becoming difficult to recognize.

As can be seen from FIG. 10, the running range boundary lines LBdn, LBhz, and LBup are lines determining a request drive power determination value FR1out that is a determination value for determining whether the running mode of the vehicle 6 at a predetermined vehicle speed V is set to the engine running or the motor running. In other words, the running range boundary lines LBdn, LBhz, and LBup are sequences of relationship between the vehicle speed V and the request drive power determination value FR1out. For example, when the running range boundary line defined based on the running road surface gradient θrd is the dashed-two dotted line LBup, if the vehicle speed V is V01, the request drive power determination value FR1out is decided as FR1out01 from the dashed-two dotted line LBup. If the request drive power FRout is greater than the request drive power determination value FR1out (=FR1out01), the engine running is performed and, if the request drive power FRout is equal to or less than the request drive power determination value FR1out (=FR1out01), the motor running is performed. Therefore, since the map changing means 166 expands the motor running range to the larger side of the request drive power FRout when the running road surface gradient θrd is larger as described above, in other words, the map changing means 166 makes the request drive power determination value FR1out larger when the running road surface gradient θrd is larger.

The request drive power deciding means 168 sequentially decides the request drive power FRout based on the accelerator opening degree Acc when the vehicle 6 is in the travelable state. Whether the vehicle 6 is in the travelable state is determined by the travelable state determining means 164. For example, the request drive power deciding means 168 decides the request drive power FRout such that the request drive power FRout becomes larger when the accelerator opening degree Acc is larger, based on the accelerator opening degree Acc from the request drive power map depicted in FIG. 4.

The running mode switching control means 170 switches the running mode of the vehicle 6 to either the engine running or the motor running in accordance with the running range map defined by the map changing means 166 based on the running road surface gradient θrd. Specifically, the running mode switching control means 170 acquires the vehicle speed V detected by the vehicle speed sensor 52 and the request drive power FRout decided by the request drive power deciding means 168 and determines whether the running state of the vehicle 6 indicated by the vehicle speed V and the request drive power FRout belongs to the engine running range or the motor running range. If the running state of the vehicle 6 belongs to the engine running range, the running mode of the vehicle 6 is switched to the engine running and, if the running state of the vehicle 6 belongs to the motor running range, the running mode of the vehicle 6 is switched to the motor running. In other words, the running mode switching control means 170 decides the request drive power determination value FR1out based on the vehicle speed V detected by the vehicle speed sensor 52 from the running range boundary line determined by the map changing means 166 based on the running road surface gradient θrd. The running mode switching control means 170 determines whether the request drive power FRout decided by the request drive power deciding means 168 is larger than the request drive power determination value FR1out and, if the request drive power FRout is greater than the request drive power determination value FR1out as a result of the determination, the running state of the vehicle 6 belongs to the engine running range and, therefore, the running mode switching control means 170 switches the running mode of the vehicle 6 to the engine running. Contrarily, if the request drive power FRout is equal to or less than the request drive power determination value FR1out, the running state of the vehicle 6 belongs to the motor running range and, therefore, the running mode switching control means 170 switches the running mode of the vehicle 6 to the motor running mode. For example, if the request drive power FRout increases during the vehicle running in the motor running mode, or in particular, when the request drive power FRout becomes larger than the predetermined request drive power determination value FR1out, the running mode switching control means 170 switches the running mode of the vehicle 6 from the motor running mode to the engine running mode. The map changing means 166 makes the request drive power determination value FR1out larger in comparison at the same vehicle speed V when the running road surface gradient θrd is larger and, therefore, it can be said that if the running mode of the vehicle 6 is the motor running mode, the running mode switching control means 170 maintains the motor running mode until the request drive power FRout becomes larger when the running road surface gradient θrd is larger during the vehicle running in the motor running mode.

Figure 11:
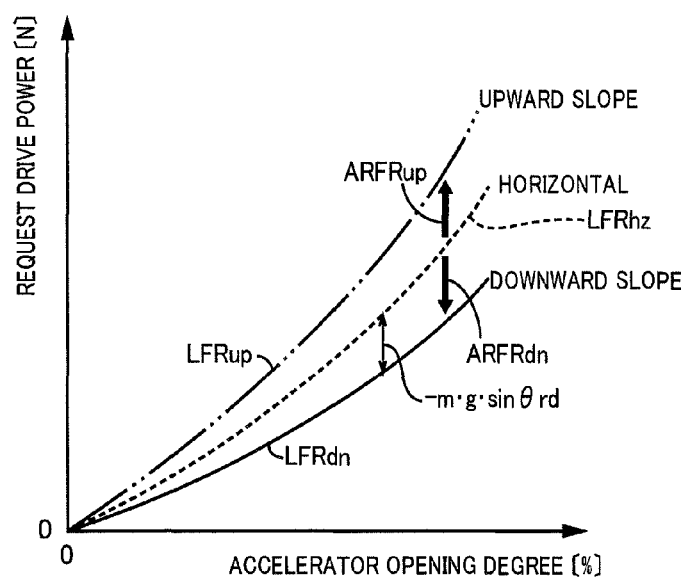
FIG. 11 is a diagram of an example of changing the request drive power map depicted in FIG. 4 depending on the running road surface gradient.

As described above, while the running range map is changed depending on the running road surface gradient θrd (see FIG. 10), the request drive power map is not changed depending on the running road surface gradient θrd in this example; however, contrarily, the running range map may not be changed depending on the running road surface gradient θrd and the request drive power map may be changed depending on the running road surface gradient θrd instead. An example of changing the request drive power map depending on the running road surface gradient θrd is depicted in FIG. 11. FIG. 11 is a diagram of an example of changing the request drive power map depicted in FIG. 4 depending on the running road surface gradient θrd. For example, in FIG. 11, if the accelerator opening degree Acc is zero, the request drive power FRout is zero regardless of the running road surface gradient θrd; a solid line LFRdn indicates relationship between the request drive power FRout and the accelerator opening degree Acc on a downward slope with a certain gradient, i.e., the request drive power map of the downward slope; a broken line LFRhz indicates the request drive power map of the horizontal road surface; and a dashed-two dotted line LFRup indicates the request drive power map of an upward slope with a certain gradient. Therefore, based on the request drive power map of the horizontal road surface, if the running road surface 74 is a downward slope, the request drive power map is changed from the broken line LFRhz to the solid line LFRdn depending on the running road surface gradient θrd as indicated by an arrow ARFRdn and, if the running road surface 74 is an upward slope, the request drive power map is changed from the broken line LFRhz to the dashed-two dotted line LFRup depending on the running road surface gradient θrd as indicated by an arrow ARFRup.

In short, if the request drive power map is changed depending on the running road surface gradient θrd, as depicted in FIG. 11, the map changing means 166 changes the request drive power map such that the request drive power FRout decided according to a certain accelerator opening degree Acc becomes smaller when the running road surface gradient θrd is larger. If the request drive power map is changed depending on the running road surface gradient θrd in this way, the map changing means 166 makes a change rate of the request drive power FRout to the accelerator opening degree Acc smaller when the running road surface gradient θrd is larger, as can be seen by comparing the solid line LFRdn, the broken line LFRhz, and the dashed-two dotted line LFRup of FIG. 11 with each other. The change rate of the request drive power FRout to the accelerator opening degree Acc is a gradient of the solid line LFRdn, the broken line LFRhz, or the dashed-two dotted line LFRup relative to the horizontal axis in the case of FIG. 11. The request drive power deciding means 168 deciding the request drive power FRout in accordance with the request drive power map determines the request drive power FRout such that the request drive power FRout becomes smaller in comparison at the same accelerator opening degree Acc when the running road surface gradient θrd is larger. The running range map is not changed depending on the running road surface gradient θrd and the running mode switching control means 170 switches the running mode of the vehicle 6 to either the engine running or the motor running in accordance with the running range map not changed depending on the running road surface gradient θrd as depicted in FIG. 3, For example. If the request drive power map is changed depending on the running road surface gradient θrd as depicted in FIG. 11 in this example, the request drive power map is set in advance such that the request drive power FRout corresponding to the running road surface gradient θrd is defined as a value acquired by subtracting the propelling force in the traveling direction acting on the vehicle 6 due to gravity from the request drive power FRout when the running road surface 74 is horizontal (a horizontal road surface). Therefore, the request drive power deciding means 168 following the request drive power map sets the request drive power FRout corresponding to the running road surface gradient θrd to a value acquired by subtracting the propelling force in the traveling direction acting on the vehicle 6 due to gravity from the request drive power FRout when the running road surface 74 is horizontal. Specifically, when "g", "m", and "FRouthz" denote gravitational acceleration, mass of the vehicle 6, and the request drive power FRout when the running road surface 74 is horizontal, respectively, the request drive power FRout corresponding to the running road surface gradient θrd is calculated by "FRouthz−m×g× sin θrd".

Figure 12:
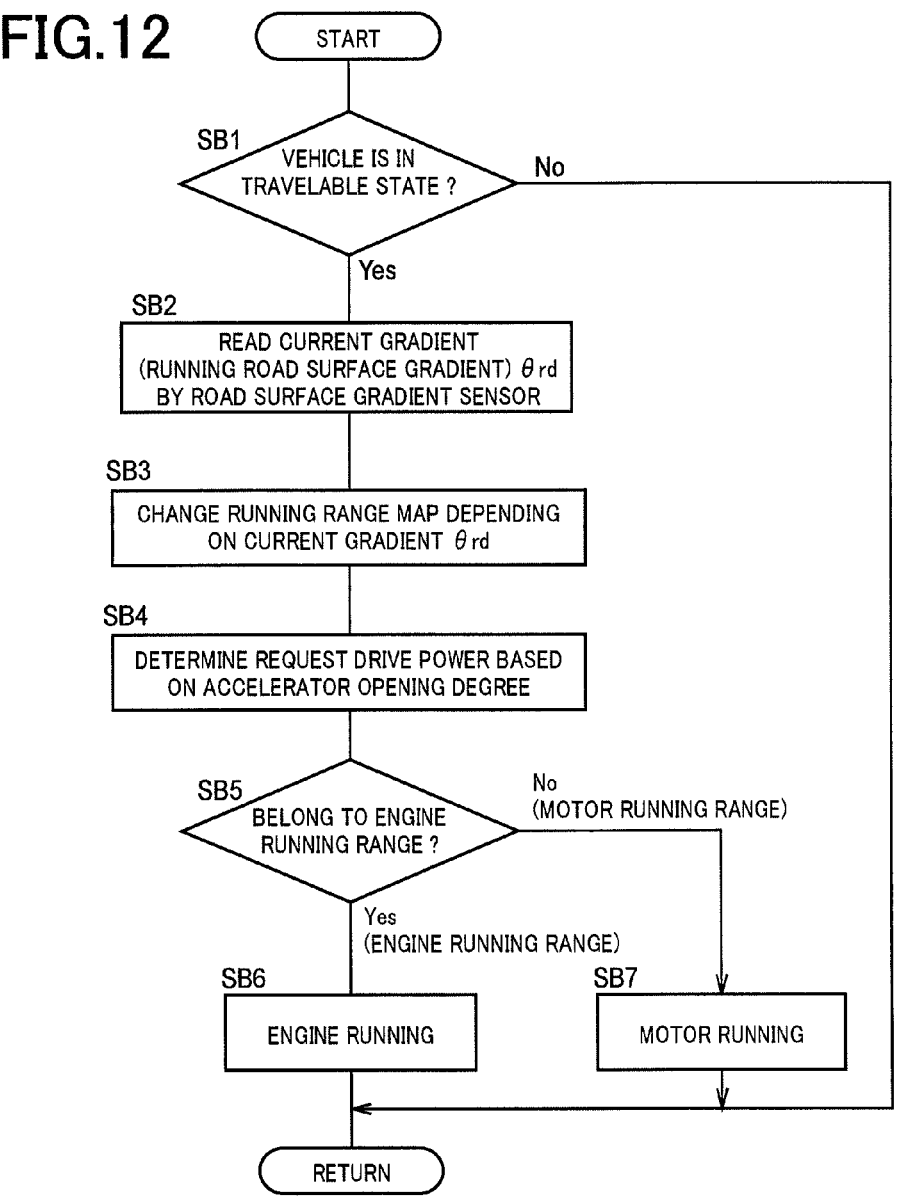
FIG. 12 is a flowchart of the second example to explain a main portion of the control operation of the electronic control device of FIG. 9, i.e., the control operation of switching the running mode of the vehicle to the engine running or the motor running.

FIG. 12 is a flowchart to explain a main portion of the control operation of the electronic control device 160, i.e., the control operation of switching the running mode of the vehicle 6 to the engine running or the motor running and is repeatedly executed with an extremely short cycle time, for example, on the order of a few msec to a few tens of msec. The control operation depicted in FIG. 12 is performed solely or concurrently with another control operation.

First, at SB1 corresponding to the travelable state determining means 164, it is determined whether the vehicle 6 is in the travelable state. If the determination at SB1 is affirmative, i.e., if the vehicle 6 is in the travelable state, the operation goes to SB2. On the other hand, if the determination at SB1 is negative, this flowchart is terminated.

At SB2, the running road surface gradient θrd detected by the road surface gradient sensor 44 is acquired. SB2 is followed by SB3.

At SB3, as depicted in FIG. 10, the running range map is changed and decided depending on the running road surface gradient θrd acquired at SB2. SB3 is followed by SB4. SB2 and SB3 correspond to the map changing means 166.

At SB4 corresponding to the request drive power deciding means 168, the request drive power FRout is decided based on the accelerator opening degree Acc. In this case, the request drive power FRout is decided in accordance with the request drive power map in which the relationship between the accelerator opening degree Acc and the request drive power FRout is not changed depending on the running road surface gradient θrd, for example, the request drive power map as depicted in FIG. 4. SB4 is followed by SB5.

At SB5, the vehicle speed V detected by the vehicle speed sensor 52 is acquired. It is then determined whether the running state of the vehicle 6 indicated by the vehicle speed V and the request drive power FRout decided at SB4 belongs to the engine running range in the running range map decided at SB3. In other words, the request drive power determination value FR1out is decided from the running range boundary line in the running range map decided at SB3 based on the acquired vehicle speed V, and it is determined whether the request drive power FRout decided at SB4 is larger than the request drive power determination value FR1out. If the determination of SB5 is affirmative, i.e., if the running state of the vehicle 6 belongs to the engine running range, in other words, if the request drive power FRout is greater than the request drive power determination value FR1out, the operation goes to SB6. On the other hand, if the determination at SB5 is negative, i.e., if the running state of the vehicle 6 belongs to the motor running range, in other words, if the request drive power FRout is equal to or less than the request drive power determination value FR1out, the operation goes to SB7.

At SB6, the running mode of the vehicle 6 is switched to the engine running. If the vehicle 6 is already during the engine running, the engine running is continued.

At SB7, the running mode of the vehicle 6 is switched to the motor running. If the vehicle 6 is already during the motor running, the motor running is continued. SB5 to SB7 correspond to the running mode switching control means 170.

The control operation of this example is as described above with reference to FIG. 12 and the running range map is changed depending on the running road surface gradient θrd at SB3 of FIG. 12; however, as described above, the running range map may not be changed depending on the running road surface gradient θrd and the request drive power map may be changed depending on the running road surface gradient θrd instead. In this case, SB3 of FIG. 12 is replaced with SB3-1 depicted in FIG. 13.

Figure 13:
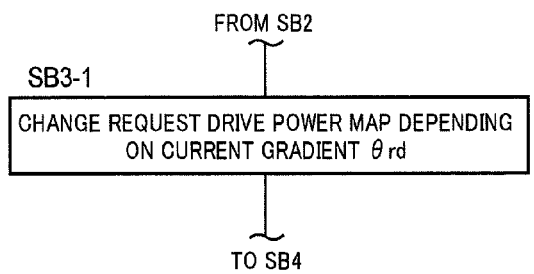
FIG. 13 depicts SB3-1 in a flowchart with SB3 in the flowchart of FIG. 12 replaced by SB3-1.

At SB3-1 of FIG. 13, the request drive power map is changed and decided depending on the running road surface gradient θrd as depicted in FIG. 11. At SB4 following SB3-1, the request drive power FRout is decided in accordance with the request drive power map decided at SB3-1, instead of the request drive power map as depicted in FIG. 4. In the flowchart having SB3 of FIG. 12 replaced with the SB3-1 of FIG. 13, whether the running state of the vehicle 6 belongs to the engine running range is determined at SB5 from the running range map not changed depending on the running road surface gradient θrd, for example, the running range map as depicted in FIG. 3. SB3-1 corresponds to the map changing means 166.

This example has the following effects (B1) to (B5). (B1) According to this example, for example, if the request drive power FRout increases during the vehicle running in the motor running mode, the running mode switching control means 170 switches the running mode of the vehicle 6 from the motor running mode to the engine running mode. The running mode switching control means 170 maintains the motor running mode until the request drive power FRout becomes larger when the running road surface gradient θrd is larger during the vehicle running in the motor running mode. In this case, since a vehicle propelling force due to gravity increases when the running road surface gradient θrd is larger, the running performance is rarely impaired even if the motor running is accordingly performed until the request drive power FRout becomes larger. Therefore, the electronic control device 160 can achieve an improvement in fuel efficiency by performing the motor running mode longer when the running road surface gradient θrd is larger without impairing the running performance.

(B2) According to this example, the map changing means 166 shifts the running range boundary line in the running range map to the larger side of the request drive power FRout when the running road surface gradient θrd is larger, thereby making the request drive power determination value FR1out larger when the running road surface gradient θrd is larger. If the request drive power FRout is greater than the predetermined request drive power determination value FR1out, the running state of the vehicle 6 belongs to the engine running range and, therefore, the running mode switching control means 170 sets the running mode of the vehicle 6 to the engine running. Therefore, the electronic control device 160 can decide the request drive power determination value FR1out based on the running road surface gradient θrd, thereby easily adjusting the opportunities for performing the motor running and the opportunities for performing the engine running, and a control load may be reduced.

(B3) According to this example, as depicted in FIG. 10, the running range boundary line (the solid line LBdn, the broken line LBhz, or the dashed-two dotted line LBup) in the running range map is not changed depending on the running road surface gradient θrd in the low/medium vehicle speed range, while the running range boundary line is shifted in the high vehicle speed range to the larger side of the request drive power FRout when the running road surface gradient θrd is larger. Therefore, a change rate of the request drive power determination value FR1out to the running road surface gradient θrd is larger when the vehicle speed V is higher. Since electric motors have a generic property making the generation of high torque difficult during high-speed rotation, a higher vehicle speed, i.e., higher-speed rotation of the second electric motor MG2 during the motor running makes the effect of the running road surface gradient θrd on the whole vehicle propelling force, i.e., the effect of the self-weight of the vehicle 6 on the whole vehicle propelling force, relatively larger. Therefore, by taking the effect of the running road surface gradient θrd, i.e., the effect of the self-weight, on the whole vehicle propelling force into consideration, the engine running and the motor running can alternately be switched so that both the fuel efficiency performance and the running performance can be satisfied over the whole change range of the vehicle speed V.

(B4) According to this example, for example, if the request drive power FRout becomes larger than the predetermined request drive power determination value FR1out during the vehicle running in the motor running mode, the running mode switching control means 170 switches the running mode of the vehicle 6 from the motor running mode to the engine running mode. As can be seen from FIG. 4 or FIG. 11, the request drive power deciding means 168 decides the request drive power FRout such that the request drive power FRout becomes larger when the accelerator opening degree Acc becomes larger. The running range map may not be changed depending on the running road surface gradient θrd and the request drive power map may be changed depending on the running road surface gradient θrd instead, and in this case, as depicted in FIG. 11, the request drive power deciding means 168 decides the request drive power FRout such that the request drive power FRout becomes smaller in comparison at the same accelerator opening degree Acc when the running road surface gradient θrd is larger. Therefore, the vehicle propelling force or the vehicle braking force due to gravity is taken into consideration so that the request drive power FRout can be decided without excess or shortage. As a result, even if the running road surface gradient θrd is different, a sufficiently large fuel efficiency improving effect from the motor running mode can be enjoyed without impairing the running performance of the vehicle 6.

(B5) According to this example, the running range map may not be changed depending on the running road surface gradient θrd and the request drive power map may be changed depending on the running road surface gradient θrd instead, and in this case, the request drive power deciding means 168 following the request drive power map sets the request drive power FRout corresponding to the running road surface gradient θrd to a value acquired by subtracting the propelling force in the traveling direction acting on the vehicle 6 due to gravity from the request drive power FRout when the running road surface 74 is horizontal. Therefore, the request drive power FRout with the effect of gravity taken into consideration can easily be calculated from the running road surface gradient θrd.

Although the examples of the present invention have been described in detail with reference to the drawings, these examples are merely an embodiment and the present invention can be implemented in variously modified and improved forms based on the knowledge of those skilled in the art.

For example, in the first example, the motoring-time target rotation speed is a target value of the engine rotation speed Ne while the motoring is performed and is a predefined constant value; however, the motoring-time target rotation speed may be changed depending on the vehicle speed V. For example, when the vehicle speed V is higher, the motoring-time target rotation speed may be set higher.

In FIG. 10 of the second example, the running range boundary line is not changed depending on the running road surface gradient θrd in the low/medium vehicle speed range and is shifted to the larger side of the request drive power FRout when the running road surface gradient θrd is larger only in the high vehicle speed range; however, the running range boundary line may be shifted to the larger side of the request drive power FRout when the running road surface gradient θrd is larger in the whole vehicle speed range.

In FIG. 10 of the second example, the engine running range is disposed on the larger side of the request drive power FRout and the motor running range is disposed on the smaller side of the request drive power FRout relative to the running range boundary line; however, predetermined hysteresis may be disposed on the running range boundary line so as to avoid frequent switching between the engine running and the motor running due to pulsation of the request drive power FRout.

Although the running range boundary line is changed depending on the running road surface gradient θrd in FIG. 10 of the second example, the running range boundary line may be changed in stages, or may continuously be changed, depending on the running road surface gradient θrd.

In the second example, the request drive power map of FIG. 11 is set in advance such that the request drive power FRout corresponding to the running road surface gradient θrd is set to a value acquired by subtracting the propelling force in the traveling direction acting on the vehicle 6 due to gravity from the request drive power FRout when the running road surface 74 is horizontal; however, a change width of the request drive power FRout corresponding to the running road surface gradient θrd may be defined in any manner relatively to the broken line LFRhz indicative of the request drive power map of the horizontal road surface as long as the request drive power FRout consistent with driver's intention can be obtained. For example, the change width may be defined in stages, or may continuously be defined, depending on the running road surface gradient θrd.

In the first and second examples, the determination vehicle speed Vm depicted in FIG. 6, the running range map depicted in FIG. 10, and the request drive power map depicted in FIG. 11 are changed depending on the running road surface gradient θrd regardless of whether the running road surface 74 is a downward slope or an upward slope; however, any or all of them may be set to the same as those of the horizontal road surface in the case of the upward slope and may be changed depending on the running road surface gradient θrd if the running road surface 74 is the downward slope. Alternatively, any or all of them may be set to the same as those of the horizontal road surface in the case of the downward slope and may be changed depending on the running road surface gradient θrd if the running road surface 74 is the upward slope.

In FIG. 6 of the first example, the change rate of the determination vehicle speed Vm to the running road surface gradient θrd is larger when the running road surface gradient θrd is closer to zero (horizon); however, for example, the determination vehicle speed Vm may be a linear function of the running road surface gradient θrd.

In the first and second examples, the request drive power determination value FR1out becomes smaller when the vehicle speed V is higher in the running range map of FIGS. 3 and 10; however, the request drive power determination value FR1out may not change depending on the vehicle speed V.

Although the first planetary gear device 20 of the first and second examples has the first carrier CA1 coupled to the engine 14, the first sun gear S1 coupled to the first electric motor MG1, and the ring gear R1 coupled to the output gear 24, these coupling relationships are not necessarily limited thereto and the engine 14, the first electric motor MG1, and the output gear 24 may be coupled to any of the three rotating elements CA1, S1, and R1 of the first planetary gear device 20.

In the first and second examples, the ring gear R2 of the second planetary gear device 22 is integrally coupled to the ring gear R1 of the first planetary gear device 20; however, the coupling destination of the ring gear R2 is not limited to the ring gear R1 and the ring gear R2 may be coupled to the first carrier CA1 of the first planetary gear device 20, for example. The ring gear R2 may be coupled to any place on the power transmission path between the first planetary gear device 20 and the drive wheels 40 instead of the ring gear R1.

Although a transmission is not disposed on the power transmission path between the output gear 24 and the drive wheels 40 in the first and second examples, the power transmission path may be disposed with a manual transmission or an automatic transmission.

Although the input shaft 18 is coupled via the damper 16 to the engine 14 in the first and second examples, the damper 16 may not be included and the input shaft 18 may be coupled to the engine 14 directly or via a transmission belt, a gear, etc.

Although the power transmission device 10 of the first and second examples is not disposed with a power disconnection/connection device such as a clutch between the engine 14 and the first planetary gear device 20, such a power disconnection/connection device may be interposed between the engine 14 and the first planetary gear device 20. The same applies to the first electric motor MG1 and the second electric motor MG2 and the power disconnection/connection device may be interposed between the first electric motor MG1 and the first planetary gear device 20 or between the second electric motor MG2 and the second planetary gear device 22.

In the first and second examples, the control of the operating state of the first electric motor MG1 allows the first planetary gear device 20 to act as an electric continuously variable transmission having the gear ratio thereof continuously varied; however, for example, the gear ratio of the first planetary gear device 20 may intentionally be changed in stage(s) (stepwise), rather than continuously, by utilizing the differential effect.

Although both the first planetary gear device 20 and the second planetary gear device 22 are single-planetary in the first and second examples, one or both of the devices may be double-planetary.

In the first and second examples, the first carrier CA1 making up the first planetary gear device 20 is coupled to the engine 14 in a power transmittable manner and the first sun gear S1 is coupled to the first electric motor MG1 in a power transmittable manner while the first ring gear R1 is coupled to the power transmission path to the drive wheels 40; however, for example, the first planetary gear device 20 may be replaced with two planetary gear devices and, in a configure of the two planetary gear devices coupled to each other by a portion of rotating elements making up the planetary gear devices, the rotating elements of the planetary gear devices may respectively be coupled to the engine, the electric motor, and the drive wheels in a power transmittable manner such that stepped shifting and stepless shifting can be switched through the control of clutches and brakes coupled to the rotating elements of the planetary gear devices.

Although the second electric motor MG2 in each of the first and second examples is connected via the second planetary gear device 22 to the output gear 24 making up a portion of the power transmission path from the engine 14 to the drive wheels 40, the second electric motor MG2 may also be connectable via an engagement element such as a clutch to the first planetary gear device 20 in addition to the coupling to the output gear 24 such that the differential state of the first planetary gear device 20 can be controlled by the second electric motor MG2 instead of the first electric motor MG1 in the configuration of the power transmission device 10.

Figure 14:
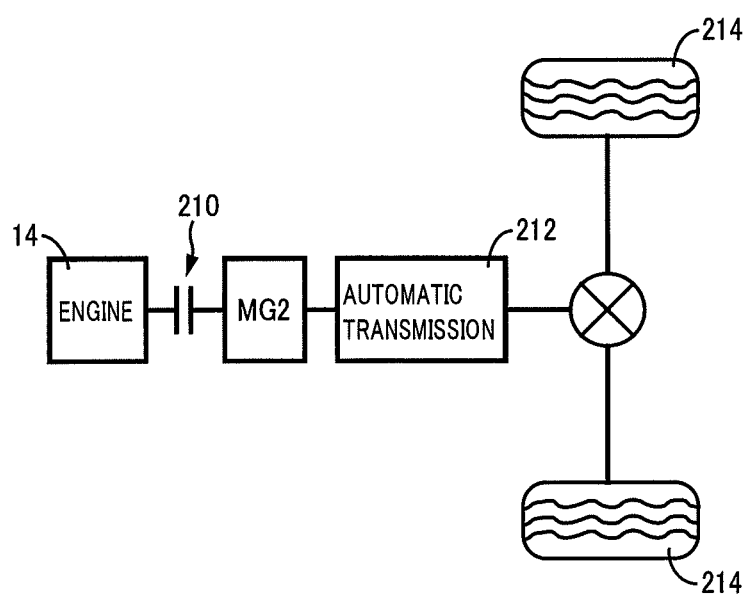
FIG. 14 is a diagram of a mechanical configuration of a parallel hybrid vehicle when the vehicle including the vehicle drive device of FIG. 1 is replaced by the parallel hybrid vehicle.

Although the vehicle 6 includes the first planetary gear device 20, the second planetary gear device 22, and the first electric motor MG1 in the first and second examples, the vehicle 6 may be a so-called parallel hybrid vehicle configured as depicted in FIG. 14, for example. The parallel hybrid vehicle depicted in FIG. 14 does not include the first planetary gear device 20, the second planetary gear device 22, and the first electric motor MG1 and is a vehicle having the engine 14, a clutch 210, the second electric motor MG2, an automatic transmission 212, and drive wheels (rear wheels) 214 coupled in series. In the parallel hybrid vehicle depicted in FIG. 14, the motoring of the engine 14 is performed by slipping the clutch 210, for example.

The plurality of the examples described above may be implemented in a mutually combined manner by setting priorities, for example. For example, in a control operation implemented by mutually combining the first example and the second example, the flowchart of FIG. 8 and the flowchart of FIG. 12 are alternately executed.

NOMENCLATURE OF ELEMENTS

6: vehicle
14: engine
60: electronic control device (vehicle drive control device)
74: running road surface
MG2: second electric motor (electric motor for running)
θrd: running road surface gradient (gradient)

The invention claimed is:

1. A vehicle drive control device in a vehicle having an engine and an electric motor, the vehicle running with at least one of the engine and the electric motor used as a drive power source for running, the vehicle drive control device comprising:
   a motoring determining portion configured to determine whether a vehicle speed is equal to or greater than a predetermined vehicle speed; and
   a motoring control portion configured to rotate the engine remaining in a no-drive state if the motoring determining portion determines that the vehicle speed is equal to or greater than the predetermined vehicle speed during vehicle running with the engine in the no-drive state,
   the motoring determining portion configured to set the predetermined vehicle speed higher when a gradient of a running road surface on which the vehicle is running becomes larger, the gradient having a positive direction corresponding to descent.

2. The vehicle drive control device of claim 1, wherein a change rate of the determination vehicle speed to the gradient of the running road surface is larger when the gradient of the running road surface is closer to zero.

3. The vehicle drive control device of claim 1, further having a running mode switching control portion during vehicle running in a motor running mode with the engine in the no-drive state and the electric motor used as the drive power source for running, if a request drive power requested to the vehicle increases, configured to switch a running mode of the vehicle from the motor running to engine running for running with at least the engine used as the drive power source for running, and wherein
   during vehicle running in the motor running, when the gradient of the running road surface becomes larger, the running mode switching control portion maintains the motor running until the request drive power becomes larger.

4. The vehicle drive control device of claim 3, further having a map changing portion configured to increase a predetermined request drive power determination value when the gradient of the running road surface becomes larger, and wherein
   if the request drive power is larger than the predetermined request drive power determination value, the running mode switching control portion sets the running mode of the vehicle to the engine running.

5. The vehicle drive control device of claim 4, wherein a change rate of the request drive power determination value to the gradient of the running road surface is larger when the vehicle speed is higher.

6. The vehicle drive control device of claim 1, further having a running mode switching control portion during vehicle running in a motor running mode with the engine in the no-drive state and the electric motor for used as the drive power source for running, if a request drive power requested to the vehicle becomes larger than a predetermined request drive power determination value, configured to switch a running mode of the vehicle from the motor running to engine running for running with at least the engine used as the drive power source for running, and
   a request drive power deciding portion configured to determine the request drive power such that when an accelerator opening degree becomes larger, the request drive power becomes larger, and wherein
   the request drive power deciding portion determines the request drive power such that when the gradient of the running road surface becomes larger, the request drive power becomes smaller.

7. The vehicle drive control device of claim 6, wherein
   the request drive power deciding portion sets the request drive power corresponding to the gradient of the running road surface to a value acquired by subtracting a propelling force in a traveling direction acting on the vehicle due to gravity from the request drive power when the running road surface is horizontal.

* * * * *